United States Patent [19]

Kreckel et al.

[11] Patent Number: 5,672,402

[45] Date of Patent: Sep. 30, 1997

[54] REMOVABLE ADHESIVE TAPE

[75] Inventors: Karl W. Kreckel, Haan, Germany; Patrick J. Hager, Woodbury; James H. Rickert, Marine, both of Minn.

[73] Assignee: Minnesota Mining and Manufacturing Company, St. Paul, Minn.

[21] Appl. No.: 487,142

[22] Filed: Jun. 7, 1995

Related U.S. Application Data

[62] Division of Ser. No. 259,747, Jun. 6, 1994, Pat. No. 5,516,581, which is a continuation of Ser. No. 61,637, May 12, 1993, abandoned, which is a continuation of Ser. No. 802,061, Dec. 10, 1991, abandoned, which is a continuation-in-part of Ser. No. 632,173, Dec. 20, 1990, abandoned.

[51] Int. Cl.⁶ .................................................. C09J 7/02
[52] U.S. Cl. .................... 428/34.2; 428/343; 428/354; 428/355
[58] Field of Search .............................. 428/343, 354, 428/355, 34.2

[56] References Cited

U.S. PATENT DOCUMENTS

| | | |
|---|---|---|
| 1,793,328 | 2/1931 | LaBombard et al. |
| 2,049,030 | 7/1936 | Strauss ................................ 206/57 |
| 2,559,990 | 7/1951 | Oace et al. |
| 2,574,152 | 11/1951 | Lewis et al. ........................ 206/56 |
| 3,015,916 | 1/1962 | Denton ................................... 53/3 |
| 3,412,926 | 11/1968 | Bostwick ............................. 229/62 |
| 3,962,833 | 6/1976 | Johnson. |
| 4,024,312 | 5/1977 | Korpman. |
| 4,051,853 | 10/1977 | Egan, Jr. |
| 4,358,489 | 11/1982 | Green. |
| 4,563,388 | 1/1986 | Bonk et al. ...................... 428/40 X |
| 4,576,854 | 3/1986 | Kurahashi ...................... 428/343 X |
| 4,599,260 | 7/1986 | Truskolaski et al. ............... 428/207 |
| 4,636,427 | 1/1987 | Ohno et al. ................... 428/354 X |
| 4,652,473 | 3/1987 | Han ........................................ 428/35 |
| 4,666,771 | 5/1987 | Vesley et al. .................. 428/355 X |
| 4,673,611 | 6/1987 | Cross et al. ......................... 428/215 |
| 4,769,283 | 9/1988 | Sipinen et al. |
| 4,780,491 | 10/1988 | Vesley et al. ................. 428/355 X |
| 4,808,474 | 2/1989 | Sipinen .............................. 428/343 |
| 4,898,787 | 2/1990 | Min et al. ...................... 428/481 X |
| 4,934,123 | 6/1990 | Salzsauler .......................... 53/399 |
| 5,022,941 | 6/1991 | Doheny, Jr. et al. .......... 428/40 X |
| 5,084,039 | 1/1992 | Cancio et al. ................. 525/209 X |
| 5,108,815 | 4/1992 | Adams et al. ................ 428/355 X |

FOREIGN PATENT DOCUMENTS

| | | | |
|---|---|---|---|
| 2 470 055 | 5/1981 | France | B65B 11/02 |
| 77 24 383 | 11/1977 | Germany. | |
| 78 24 445 U1 | 11/1978 | Germany. | |

(List continued on next page.)

OTHER PUBLICATIONS

3M Information Folder 323, Apr. 1989.
3M Instruction Bulletin/11–E, Aug. 1987.
3M Instruction Bulletin/14–B, Mar. 1986.
Double Coated Scotch® Mount Brand Pressure Sensitive Mounting Tapes, Jan. 1979.
Pack Report, May 1991, pp. 98–99.
PCT Search Report.

Primary Examiner—Jenna Davis
Attorney, Agent, or Firm—Gary L. Griswold; Walter N. Kirn; William L. Huebsch

[57] ABSTRACT

A removable adhesive tape comprising a highly extensible and substantially inelastic backing and a layer of pressure-sensitive adhesive. The backing has a high tensile strength, has a lengthwise elongation at break of at least about 150% with less than about 50% elastic recovery after stretching. The adhesive can be a normally tacky and pressure-sensitive adhesive and is coated on at least one surface of the film backing. The adhesive is preferably highly extensible, does not separate from the backing during stretching, and has higher cohesion than adhesion to any suitable substrate. After being applied to a substrate, the adhesive tape of the present invention becomes firmly bonded, but can be easily removed without damaging the substrate by simply stretching it in a direction substantially parallel, i.e. less than about 35°, to the surface of the substrate.

8 Claims, 4 Drawing Sheets

FOREIGN PATENT DOCUMENTS

| | | |
|---|---|---|
| 33 31 016 A1 | 10/1984 | Germany . |
| 89110137 | 10/1987 | Japan . |
| 2-294377 | 12/1990 | Japan . |
| 744521 | 2/1956 | United Kingdom ........... B65D 63/10 |
| 2 004 559 A | 4/1979 | United Kingdom ............... C08J 5/00 |
| 2 098 569 A | 11/1982 | United Kingdom ........... B65D 71/02 |
| WO90/02540 | 3/1990 | WIPO . |
| WO 93/01979 | 2/1993 | WIPO ........................... B65B 13/02 |

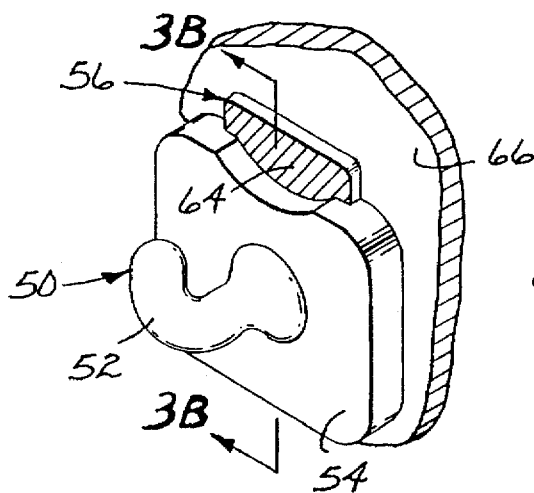
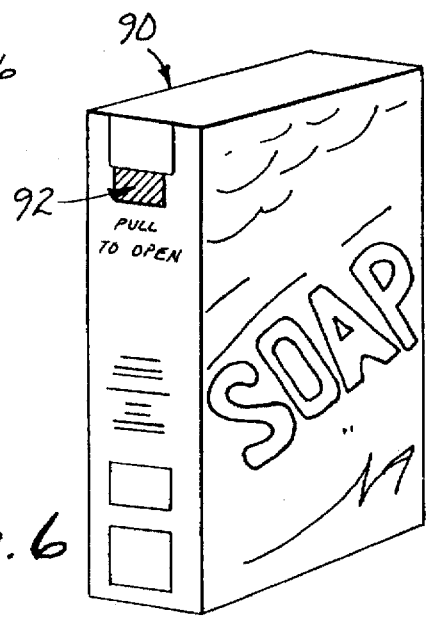
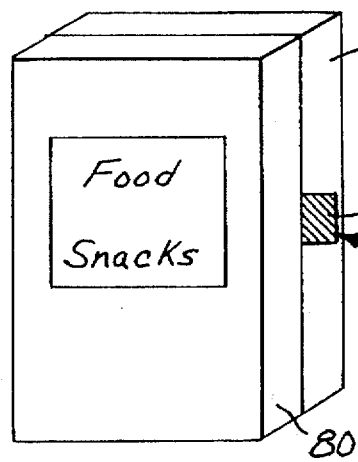
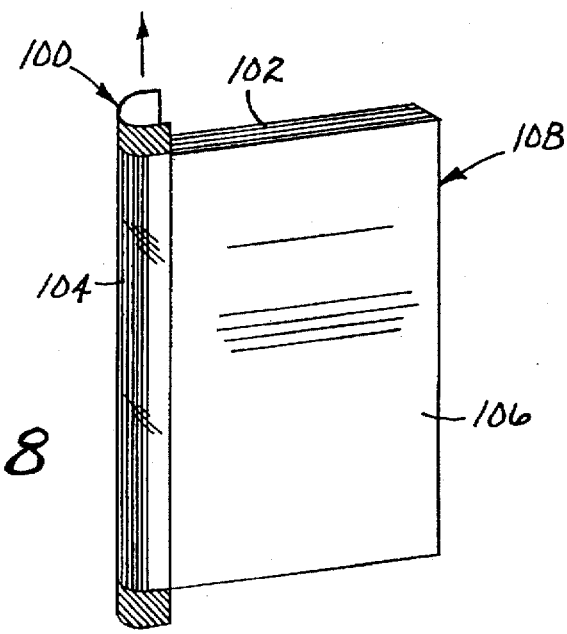

REMOVABLE ADHESIVE TAPE

CROSS-REFERENCE TO RELATED APPLICATIONS

This application is a Division of application Ser. No. 08/259,747, filed Jun. 6, 1994, now U.S. Pat. No. 5,516,581 which is a Continuation of application Ser. No. 08/061,637, filed May 12, 1993 (abandoned), which was a Continuation of application No. 07/802,061, filed Dec. 10, 1991 (abandoned) which was a Continuation-In-Part of application Ser. No. 07/632,173, filed Dec. 20, 1990 (abandoned).

BACKGROUND OF THE INVENTION

1. Field of the Invention

The present invention relates to adhesive tapes, more particularly to tapes that can be firmly adhered to a substrate and can be removed without damaging the substrate.

2. Discussion of the Art

Adhesive tapes, such as, for example, pressure-sensitive adhesive tapes, are usually firmly bonded to substrates because subsequent separation of the tapes from the substrates is neither intended nor desired. However, there are adhesive tapes wherein the adhesives are specifically formulated to allow clean and easy removal from substrates after use, such as, for example, the adhesive used for "Post-It" brand removable notes. These adhesives usually do not exhibit a substantial level of holding power, e.g., greater than 4 to 6 oz./in. adhesion to standard copy paper. Adhesives formulated to provide a substantial level of adhesion, e.g., greater than 30 oz./in. adhesion to paper, are generally difficult to remove without damaging the substrate.

U.S. Pat. No. 4,024,312 discloses a film backed, normally tacky and pressure-sensitive adhesive tape which is highly extensible and highly elastic. The tape can be easily removed from a surface to which it has been applied by stretching it lengthwise in a direction substantially parallel to the plane of the surface. The film backing is formed from a composition comprising elastomeric and thermoplastic A-B-A block copolymers, and possesses a lengthwise elongation to break of at least about 200%, preferably at least about 300%, and a 50% rubber modulus of not above about 2,000 lbs/sq. inch. This low rubber modulus is stated to be an important factor in insuring easy stretchability and easy removal of the tape at high elongations. The elasticity of the backing is important for conformability and other purposes and the elastic recovery from 50% stretch is preferably at least about 75%, more preferably at least about 90%. A preferred use for this tape is the so-called "ouchless" bandage. German (OS) 3331 016 A1 discloses another adhesive tape for removable adhesive bonds, whereby the tape exhibits high elasticity and low plasticity. The adhesive strength is less than the cohesive strength, and the adhesion capability essentially disappears as the film is being stretched. The ratio of peel force to tear strength of the tape is about 1:2 or greater and the adhesive bond can be released by pulling the film in the direction of the plane of the adhesive joint. The tape is used as a load-resistant adhesive to bond to rigid solid substrates. A separation of the adhesively bonded materials is possible without damage to the substrate.

Both of these tapes are highly elastic and exhibit large recoil when the stretching force is removed, in the same way a rubber band snaps back upon removal of the stretching force. This recoil characteristic can be dangerous, and increases the force required to debond these tapes at low angles. Finally, these highly elastic tapes tend to substantially recover their original shape when the stretching force is removed, and they are therefore not useful for indication of tampering or for guaranteeing single uses for hygienic purposes.

SUMMARY OF THE INVENTION

The present invention provides an easily removable, pressure-sensitive adhesive tape comprising a highly extensible, substantially non-recoverable backing, bearing on at least one major surface thereof a layer of pressure-sensitive adhesive, said tape being capable of being firmly bonded to a substrate and being further capable of being removed therefrom after only being stretched at an angle no greater than about 35° from the surface of the substrate.

The backing has a Young's modulus of at least about 2,500 psi, preferably at least about 3,000 psi, but less than about 75,500 psi, preferably less than about 50,000 psi, more preferably between about 5,000 and about 30,000 psi. The backing preferably has a high tensile strength, a lengthwise elongation at break of at least about 150%, and low recovery, e.g., less than about 50% elastic recovery after being stretched, preferably less than about 30% elastic recovery. The tensile strength at break of the backing must be sufficiently high so that the backing will not rupture prior to the tape's removal from the surface to which it has been adhered.

The adhesive layer has sufficient shear strength and adhesive holding power for the specific applications, its adhesive holding power to any substrate preferably being less than its cohesive strength, such that the adhesive layer will not separate from the backing when the backing is subjected to stretching. The adhesive layer is also preferably highly extensible.

The tape can be firmly bonded to a substrate and can then be removed by simply stretching the tape in a direction up to an angle of about 35° from the surface of the substrate, preferably up to about 30°, more preferably up to about 10° without leaving traces of adhesive residue on the substrate and without imparting any perceptible damage to the surface of the substrate.

This invention further provides a double coated tape comprising a backing bearing adhesive layers on both major surfaces thereof. The adhesive of each layer can be of equivalent or different chemical composition, of equivalent or different adhesion properties, of equivalent or different thickness, and coated or laminated in the same or different manner.

The tapes of this invention can be used for several purposes. The major uses of the tape of this invention are in the broad categories of mounting and joining. Both of these categories typically involve attachment of two coplanar surfaces by means of the tape, the tape typically bearing adhesive on both major surfaces thereof. Other uses of the tape of this invention are in the categories of labeling and masking. Both of these categories typically involve attachment of the tape to a single surface, the tape typically bearing adhesive on one major surface thereof only.

BRIEF DESCRIPTION OF THE DRAWINGS

FIG. 3A is a perspective view of a mounting hook employing the tape of the present invention as a means for adhering to a vertical surface.

FIG. 5 is a perspective view of two packages joined together by a double-sided tape of the present invention.

FIG. 6 is a perspective view of a package employing the tape of the present invention as a closure.

FIG. 8 is a perspective view of a pad of paper sheets bound together by the tape of the present invention.

DETAILED DESCRIPTION OF THE INVENTION

Figure 1A:
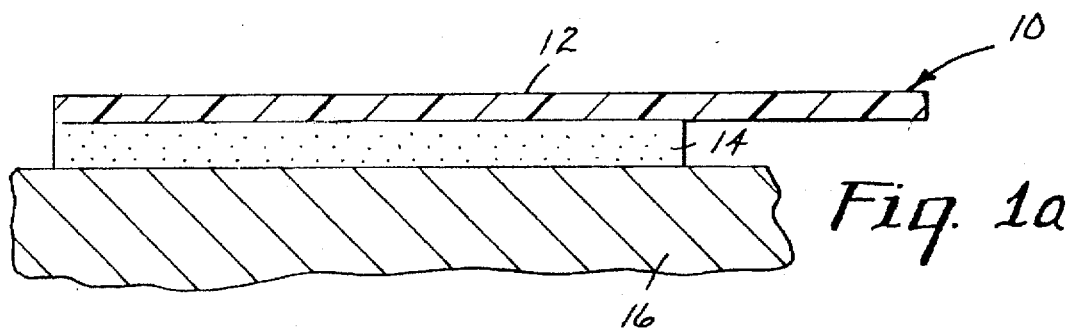
FIG. 1a is an enlarged side view in cross-section of a tape of the present invention with the backing being unstretched.

Referring to FIG. 1a, a tape 10 of this invention comprises a backing 12 bearing on at least one major surface thereof a layer 14 of pressure-sensitive adhesive. As shown in FIG. 1a, tape 10 is adhered to substrate 16. Materials suitable for the backing of the tape of this invention include highly extensible polymeric sheet materials having (1) a high tensile strength; (2) a lengthwise elongation at break of from about 50 to about 1,200%, preferably from about 150 to about 700%, more preferably from about 350 to about 700%; (3) substantial inelasticity, i.e., having less than about 50% elastic recovery after being stretched, preferably less than about 30% elastic recovery, more preferably less than about 20% elastic recovery; and (4) a Young's modulus of at least about 2,500 psi, preferably at least about 3,000 psi, but less than about 72,500 psi, preferably less than about 50,000 psi, more preferably between about 5,000 and about 30,000 psi. If the Young's modulus is too high, it is very difficult to stretch the tape sufficiently to cause clean release upon stretching. If the Young's modulus is too low, the tape loses its plastic character and becomes rubbery. The tensile strength at break of the backing must be sufficiently high so that the backing will not rupture prior to the tape's removal from the surface to which it has been adhered. The tensile strength at break of the backing is preferably at least about 4,300 psi, more preferably at least about 5,300 psi, and most preferably at least about 6,300 psi.

Representative examples of materials suitable for the backing of the tape of this invention include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used. Backings can be in the form of single or multi-layer films, non-woven films, porous films, foam-like films, and combinations of the foregoing. Backings can also be prepared from filled materials, such as, for example, filled films, e.g., calcium carbonate filled polyolefins. Backings are preferably selected from polyethylene and polypropylene films, with the most preferred materials being linear low density and ultra low density polyethylene films.

Backings can be made by any known method of film forming, such as, for example, extrusion, co-extrusion, solvent casting, foaming, non-woven technology, and the like. The backing can have any thickness so long as it possesses sufficient integrity to be processable and handleable, with thicknesses preferably ranging from about 10 micrometers to 250 micrometers. Backings having thicknesses lower than about 10 micrometers are not preferred for aggressive adhesives. Backings having thicknesses higher than about 250 micrometers tend to require stretching forces for removal that are higher than desired, thereby making removal more difficult. In the preferred range, thinner backings tend to provide easier removal than do thicker ones.

The adhesive of the adhesive layer can comprise any pressure-sensitive adhesive, with the particular adhesion properties being dependent on the use of the tape, with the preferred adhesion properties generally ranging from about 13 N/dm to about 200N/dm, preferably from about 25N/dm to about 100N/dm, at a peel angle of 180°, measured according to PSTC-1 and PSTC-3 and ASTM D 903-83 at a peel rate of 12.7 cm/min. Adhesives having higher peel adhesion levels usually require backings having higher tensile strength.

Pressure-sensitive adhesives suitable for this invention include tackified rubber adhesives, such as natural rubber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques. Crosslinked adhesives are preferred, especially those pressure-sensitive adhesives crosslinked to give high shear strengths. The most preferred adhesives are those that are crosslinked by radiation with or without a chemical cross-linking agent. Such adhesives that have high shear strength provide low debonding force and can easily be removed when stretched.

The thickness of the adhesive layer can range from about 25 micrometers to about 1,000 micrometers, preferably from about 50 micrometers to about 400 micrometers. In this preferred range of thicknesses, the thicker layers tend to cause the tapes to be more easily removable than do thinner layers. This is in contrast to conventional methods of removal, such as removal by peeling at peel angles of 90° or higher. In general, thicker layers of adhesive tend to cause the tapes to exhibit higher peel strength at a peel angle of 180° than do thinner layers. When the tapes of the present invention are released by stretching at a low angle, i.e., under 35°, the adhesive tends to be constrained by the backing and substrate for a single-coated adhesive tape and by the backing and two substrates for a double-coated adhesive tape, and is forced to undergo significant elongation. Under these conditions, the adhesive layer (or each adhesive layer) contracts, which reduces its cross-sectional area. Since the cross-sectional area, i.e., thickness times width, of a thinner layer of adhesive is already less than that of a thicker layer of adhesive, stress, i.e., force per unit area, is greater in the thinner layer of adhesive than in the thicker layer of adhesive. This leads, in effect, to a stiffening of the adhesive. Because stiffer layers offer more resistance to deformation, the force required for debonding is greater.

The tape of this invention can be produced by any conventional method for preparing pressure-sensitive adhesive tapes. For example, the adhesive can either be directly coated onto the backing, or it can be formed as a separate layer and then later laminated to the backing. In some cases, in order to improve adhesion of the adhesive layer to the backing, the backing can be pretreated prior to the coating step or the laminating step in one or more of the following ways: corona discharge, plasma discharge, flame treatment, electron beam irradiation, ultraviolet radiation, acid etching, or chemical priming. Such pretreatments can be carried out with or without reactive chemical adhesion promoters such as hydroxyethyl acrylate or hydroxyethyl methacrylate, or other reactive species of low molecular weight. Corona discharge pretreatment is generally preferred if a polymeric film backing is used.

Removing the tape from the surface of a substrate can be carried out by simply stretching the tape in a direction up to an angle of about 35° from the surface. Removal at the appropriate angle will result in leaving no appreciable adhesive residues and in preventing the surface of the substrate from being damaged.

Figure 1B:
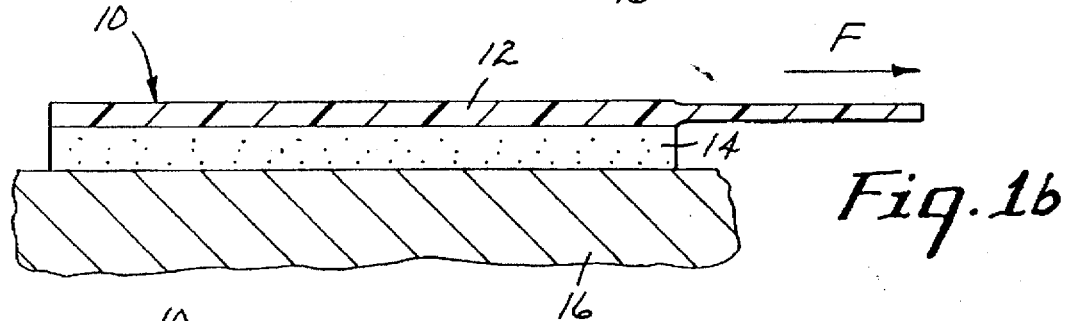
FIG. 1b is an enlarged side view in cross-section of a tape of the present invention with the backing being stretched but the adhesive still holding to the substrate.
Figure 1C:
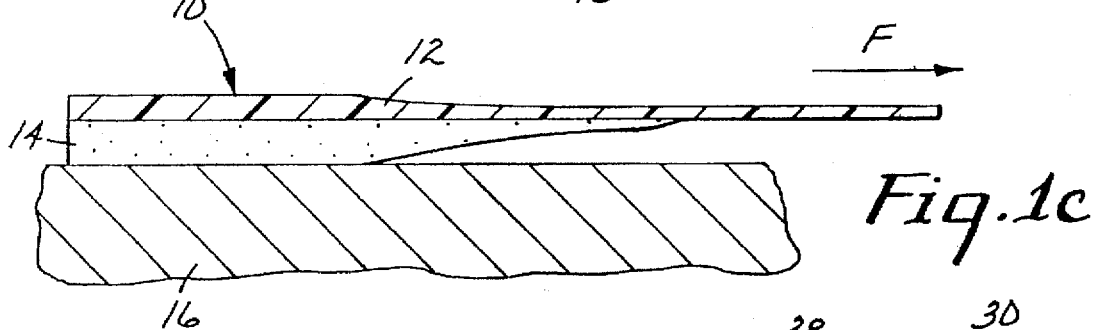
FIG. 1c is an enlarged side view in cross-section of a tape of the present invention with the backing being stretched and the adhesive beginning to cease holding to the substrate.

A schematic illustration of debonding or removal by stretching is shown in FIGS. 1a, 1b, and 1c. FIG. 1a shows a single-coated tape of the present invention having a backing bearing a layer of pressure-sensitive adhesive, which layer bonds the tape to a substrate. Force F is applied in a direction substantially parallel to the surface of the substrate. The initial resistance to shearing stress of this type is high. When sufficient force is applied to overcome this resistance, the backing begins to deform. In FIG. 1b, the backing yields while the adhesive elongates and orients, thereby undergoing elongational stiffening due to reduced cross-sectional area. This stiffening effect then causes stress to transfer to the interface, effecting debonding as shown in FIG. 1c, with substantially no triaxial stress and no filamentation in the adhesive layer.

Debonding of a highly elongated adhesive tape of this invention at low angles is characterized by a "sharp" type of crack propagation. Like fracture of glassy materials, a sharp crack leads to high stress concentration at the crack front, where there is a low volume of adhesive material (in which stress may be dissipated). High stress concentration at the crack front leads to what is called brittle cleavage failure of the adhesive. Such failure typically occurs with low force (because of the low amount of energy dissipated in the adhesive material) and is cleanly interfacial.

In contrast, for higher peeling angles, i.e., angles greater than 35°, the backing does not stretch and the adhesive is observed to undergo filamentation and to rupture cohesively. Like fracture of glassy materials, propagation of a "blunt" crack is preceded by crazing. In this model, the observed filamentation of the adhesive at higher angles serves principally as an energy dissipation mechanism, analogous to craze fibrils found in glassy materials. The greater the energy dissipation, the greater the resistance to peeling and the higher the force required to peel the tape. A larger volume of material is involved in energy dissipation, and, as stated previously, stress is less concentrated. The adhesive filaments rupture cohesively to leave residue of adhesive on the surface or to cause damage to the surface.

The tape of this invention can be used in several areas, including the following categories:

(1) mounting applications, such as wall hangings, body side moldings on vehicles, carrying handles, signing application, e.g., road signs, vehicle markings, transportation markings, and reflective sheetings, etc.;

(2) joining applications, such as adhering two or more containers, e.g., boxes, for later separation, etc.;

(3) closure applications, such as container closures, e.g., box closures, closures for food and beverage containers, and the like, diaper closures, surgical drape closures, etc.;

(4) removable labels, such as price tags or identification labels on containers, etc.; and (5) medical applications, such as bandages, etc.

Figure 2:
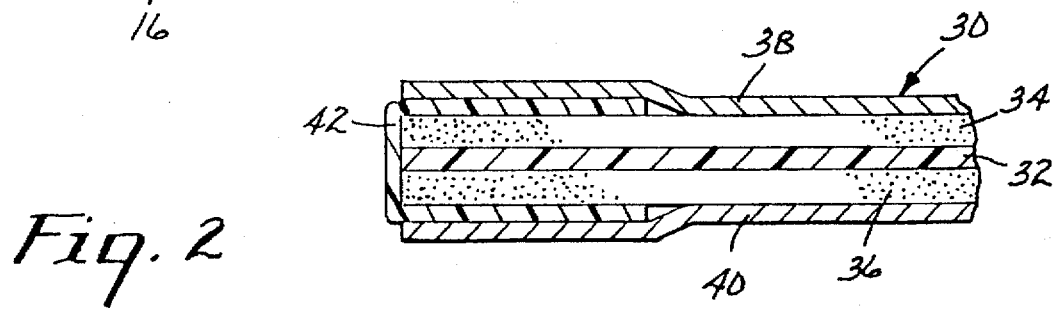
FIG. 2 is an enlarged side view in cross-section of a tape of the present invention having adhesive layers on both major surfaces thereof and an adhesive-free tab.
Figure 7:
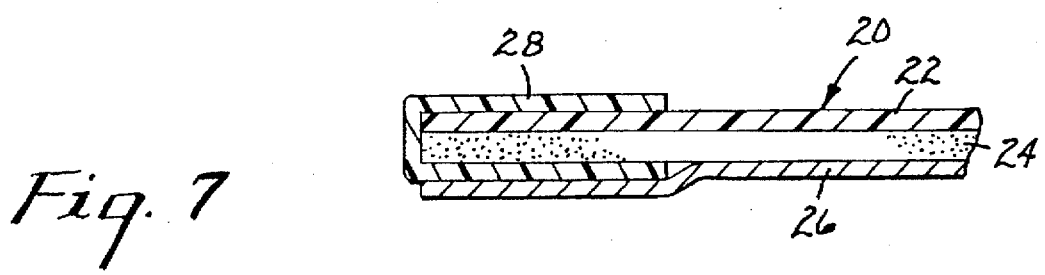
FIG. 7 is an enlarged side view in cross-section of a tape of the present invention having a single layer of adhesive and an adhesive-free tab.

The particular construction of the tape, e.g., the type of backing, the type of adhesive compositions, and relative position of backing and adhesive layers, are often required to be different for each category of use. Tape constructions include single-coated tapes and double-coated tapes. A single-coated tape is one that has a layer of adhesive on one major surface of the backing. The tape in FIG. 1a is a single-coated tape, as is the tape in FIG. 7. Tape 20 in FIG. 7 comprises a backing 22 bearing on one major surface thereof a layer of adhesive 24. Layer of adhesive 24 is adhered to a removable release liner 26. An adhesive-free tab 28 covers a portion of adhesive layer 24 to provide for grasping tape 20 for easy removal from substrates to which it will be subsequently adhered. A double-coated tape is one that has a layer of adhesive on both major surfaces of the backing. The tape in FIG. 2 is a double-coated tape. Tape 30 in FIG. 2 comprises a backing 32 bearing on both major surfaces thereof layers of adhesive 34, 36. Layer of adhesive 34 is adhered to a first removable release liner 38, and layer of adhesive 36 is adhered to a second removable release liner 40. An adhesive-free tab 42 covers a portion of adhesive layers 34 and 36 to provide for grasping tape 30 for easy removal from substrates to which it will be subsequently adhered. The materials for the backings and for the adhesive layers of tapes 20 and 30 can be the same as those previously described for tape 10. The adhesive-free tabs can be made from polymeric materials or paper materials, preferably from the same materials as are useful for preparing the backings. They may also be constructed by leaving one end of the tape uncoated with adhesive.

It is preferred that the backing be corona treated prior to application of adhesive when the backing is a polymeric film. Multiple backing constructions can also be used. For example, the tape of this invention may comprise several distinct layers, and may be made with non-woven webs, foamed polymers, or stacked or alternating layers of elastic and plastic materials, so long as the total construction exhibits good elongation, e.g., greater than 100%, and low elastic recovery, e.g., less than 50%. Multiple backing tapes of this invention can comprise two or more backings, which backings can be bonded one to another by adhesives, e.g., pressure sensitive adhesives, or by laminating.

As indicated previously, because of the substantially plastic nature of the backings, the tapes of the present invention do not return to their original shape or size after being stretched, and, consequently, can also be employed as tamper-indicating tapes.

Figure 3B:
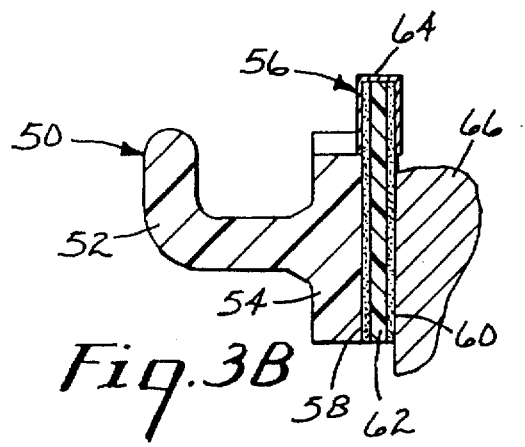
FIG. 3B is a view in cross-section of the mounting hook of FIG. 3A taken along line B—B' of FIG. 3A.

FIG. 3A and FIG. 3B show an embodiment of a tape of the present invention in a mounting application. Hooks are commonly used in most households to hang pictures, towels, garments, kitchenware, tools, plants, and other articles. Conventional hooks often require forming holes in cabinets, ceilings, walls, or woodwork when nails, screws, pins, tacks, or other mechanical devices are used for adhering the hooks to these substrates. Holes are not a problem when they are hidden by a picture, but the holes must be filled upon removal of the picture. Picture hooks bonded by means of conventional adhesive tapes are difficult, if not impossible, to remove without scraping or otherwise damaging the surface of the wall. Removable picture hooks employing tapes of the present invention can be used to mount hooks that securely hold pictures, wall hangings, and other decorations. By using tapes of the present invention for mounting, such hooks can be held securely in place during use and can be removed when desired without damaging the surface of the substrate. As shown in FIG. 3A and FIG. 3B, mounting assembly 50 comprises a hook portion 52 and a support 54 therefor, which support is adhered to a double-coated tape 56 by means of one of the layers 58, 60 of pressure-sensitive adhesive that are borne by backing 62. If desired, a tab 64 can also be provided to allow grasping of tape 56, in order to facilitate removal of tape 56 from wall 66. Tab 64 can be formed by any known method of producing a non-adhesive grasping area, such as by applying a non-adhesive material onto the adhesive to render it non-tacky. Tab 64 can be left exposed or the hook design can be such that tab 64 is concealed by support 54.

Adhesive layer 60 is capable of firmly bonding to wood, metal, glass, and ceramic surfaces. In order to use mounting assembly 50, a protective liner (not shown) is peeled to expose layer 60 of adhesive, and mounting assembly 50 is then pressed on wall 66 in the desired location. In order to remove mounting assembly 50, tab 64 at the top of mounting assembly 50 can be pulled in a direction parallel to wall 66. As tape 56 stretches, it slowly releases mounting assembly 50 from the wall. Each hook can be designed to hold loads, even in excess of 15 pounds per lineal inch, yet can be removed without leaving any residue on the surface of the wall.

Figure 4:
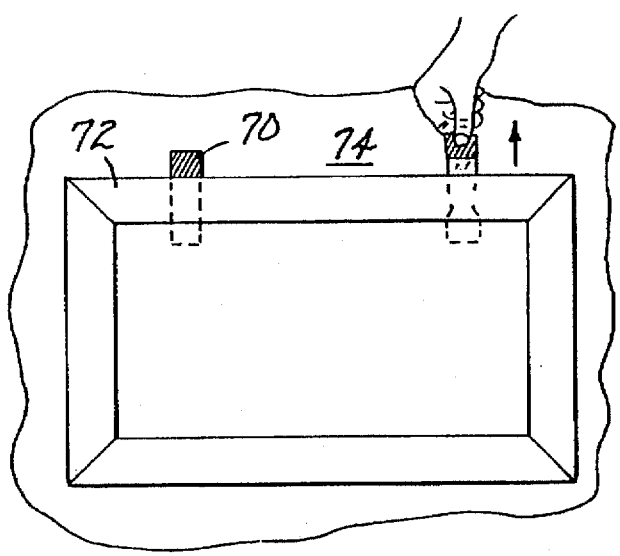
FIG. 4 is a front view of an object, e.g., a painting, calendar, etc. adhered to a vertical surface by means of the tape of the present invention.

Other mounting applications for the tape of this invention involve the use of the tape by itself without a hook-bearing mounting assembly, as shown in FIG. 4. The tape of this invention provides the holding power of currently available adhesive-backed permanent mounting tapes and die cut squares along with the feature of clean removability. The tape, by itself, can be used for mounting of objects, e.g., body side moldings and shelves. The tape can also be used to mount objects of lower weight, e.g., calendars, posters, and signs. In FIG. 4, a tape 70 of this invention is shown to be adhering a picture frame 72 to a wall 74.

Another mounting application for tapes of this invention involves removable graphics. Graphic films, including reflective films, currently in use employ aggressive pressure-sensitive adhesives that give long adhesion durability; however, they are difficult to remove from the surface of a substrate. Methods for film removal currently in use employ heat (from a heat gun, heat lamp, or hot water) or organic solvents or both. Removal by heat may still leave deposits of adhesive on the substrate which must be removed with organic solvents. Solvents and peeling action may damage the surface by removing paint or other finishes. Solvents require precautions for proper ventilation, fire prevention, storage, and disposal. Some of these methods require temperatures above a minimum temperature or with a specified temperature range. The tape of this invention allows the use of aggressive adhesives, but provides a much simpler and easier means of removal. The graphic film can be removed from a substrate by stretching the extensible layer substantially in the plane of the substrate. This manner of removal is clean and dry, thereby avoiding environmental, health, storage, and disposal problems associated with organic solvents. In addition, the tapes tend to leave no adhesive residue on the substrate or damage the substrate, e.g., remove paint. These characteristics provide savings of both cost and time to the user.

FIG. 5 illustrates a joining application, such as holding two or more containers 80 and 82, e.g., boxes, securely together for later separation. Double-coated pressure-sensitive adhesive tape 84 having a tab 86 for grasping is preferred for this application. When separation is desired, tab 86 is simply pulled to stretch tape 84. This system is superior to conventional joining systems where a double-coated tape, an adhesive layer, or glue is used and where separation of layers joined by an aggressive adhesive generally defaces the package.

FIG. 6 shows an easily openable container 90 utilizing the tape 92 of this invention. Containers utilizing conventional closures, e.g., heat seals, adhesives, and perforated cardstock or chipboard, can be difficult to open, particularly in the absence of a cutting tool. The act of opening often damages the container, which in many cases is often intended to be used as a dispenser. The tape of this invention can provide sufficient strength for closure and can also provide means for indication of tampering.

Paper clips and staples are commonly used as fastening devices for paper, film, and the like. Paper clips hold flat objects, e.g., sheets of paper, together at the edge and are limited to holding a few sheets. Paper clips may damage paper sheets by both "embossing" the sheets and bending the surface of the sheets where the clips are attached. When staples are used to fasten paper sheets together, they form small holes in the sheets. Moreover, individual sheets can be severely damaged by being torn from the group of fastened sheets. Staples are also difficult to remove, they are sharp, and consequently injurious, and they result in litter, especially in the vicinity of copying machines. The adhesive tapes of this invention can be used as substitutes for paper clips and staples. These tapes can be attached firmly to paper sheets, yet can be removed easily and cleanly when the tapes are stretched. Single and double-coated tapes can be used for this application.

The tape of this invention can be used as a fastening device for two or more articles, such as sheets, e.g., paper, film. Two sheets can be fastened together with a tape of the type shown in FIG. 2 of this invention, i.e., a tape having a backing that is coated on both major surfaces with an aggressive pressure-sensitive adhesive. Upon removal of the tape, the damage to the sheets will be minimal, and little residual adhesive will remain thereon. More than two sheets can be fastened together, as shown in FIG. 8, by a tape 100 of this invention. Tape 100 can be adhered to the back 102, sides 104, and front 106 of a pad 108 of sheets in a length-wise manner to form a removable edge binding. When tape 100 is pulled in the direction of the arrow, it can be cleanly removed from the surfaces to which it had been adhered.

Figure 9:
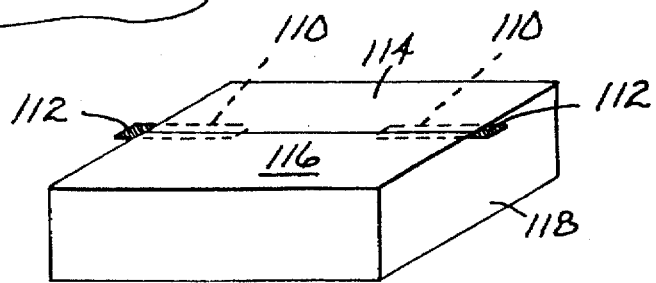
FIG. 9 is a perspective view of a box, the flaps of which are sealed by the tape of the present invention.

Boxes are commonly used for storage and transportation of a variety of items. Such boxes are usually sealed tightly to keep out foreign objects and to minimize impact forces during transportation. At the same time, access to the boxes must be relatively easy at the time one desires to remove some or all of the contents. Easily openable box seals, as shown in FIG. 9, can be made from adhesive tapes of the present invention. These seals can be used to securely seal a box, yet can easily be removed in order to open the box by firmly pulling on a tab. When the tab is pulled, the adhesive is removed from the surface of the box, and the box can be opened without the surface thereof being damaged. When resealing is desired, the flaps can be refolded and bonded by another tape seal. In FIG. 9, a double-coated tape 110 having a tab 112 for gasping is used to join two flaps 114, 116 of a box 118 to close same. A tape for box sealing can bear a layer of adhesive on only one surface of the backing and be applied to the outside of the box to close same.

Figure 10:
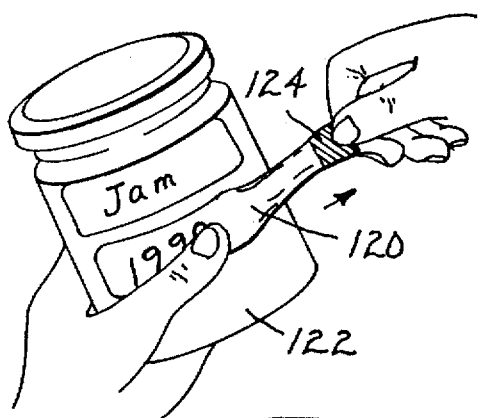
FIG. 10 is a perspective view of a container that utilizes the tape of this invention as a label.

Adhesive-coated labels have been widely used for labeling articles for identification, pricing, and the like. For labeling household items such as food storage containers and recording tapes for identification, the labels should bond well to the surface of a substrate so that the article can be identified, and should be easily removable at a later time when re-labeling is desired. Many household labels that provide adequate adhesion are not easily removable and leave behind adhesive residue on the surfaces to which they are bonded. Labels that are easily removable often do not provide adequate adhesion, detach during use, and render the article unidentifiable. A single-coated tape can be used to form a label or a mask. The tape can be removed by pulling it at an angle of less than 35° from the surface of the substrate to which it is adhered. Labels made from tapes of the present invention have high adhesion and can be held firmly in place during use, yet they can be easily removed without leaving adhesive residue or damaging the surfaces to which they are bonded, as shown in FIG. 10. The label 120 can be removed from container 122 by pulling it in a direction substantially tangential to the surface to which it is bonded. Label 120 preferably has a tab 124 by means of which the tape may be easily grasped for removal. Coupons, price tags, advertisements, and the like can also be made from tapes of the present invention.

Tapes of the present invention are especially suited for tamper-indicating applications because, upon stretching, they do not recover their original shapes. Tamper-indicating tapes of this invention can be used in closures for over-the-counter medication, closures for containers for foods and beverages, e.g., pull tabs for juice cans, easy-to-open security envelopes, price tags, or UPC code labels.

Figure 11:
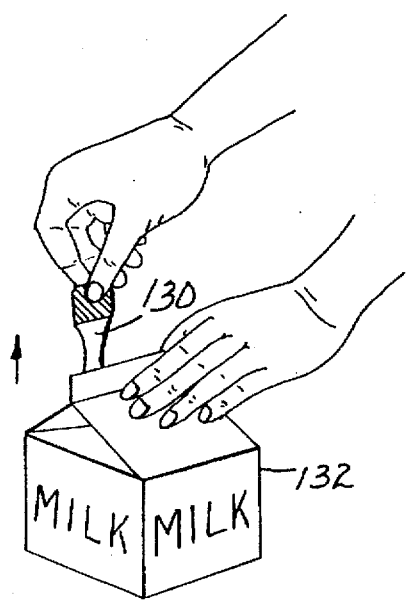
FIG. 11 is a perspective view of a gable-top container that utilizes the tape of this invention as a closure.

FIG. 11 shows how a tape 130 of this invention can be used to seal a container 132 having a gabled-top.

Other uses for the tapes of this invention include abrasive, anti-slip, and controlled release delivery. In an abrasive application, a coated abrasive disc can be applied to a rotary sanding device by means of the tape of this invention. This disc would be held firmly yet would be easily removable. The tape can also be used for adhering a removable, non-slip article, e.g., appliqués or strips, on stairs, docks, boat decks, and bath tubs. Again, the tape provides excellent holding power and easy removal. Ease of removal allows cleaning and repainting. Controlled release delivery applications include anti-fouling films, "no-pest" strips, and transdermal drug delivery. For delivery of controlled release materials, the tape allows fastening of the delivering substrate with strong holding power, yet also allows easy removal for replacement when the delivery is complete for that dose or when the available active ingredient is exhausted. An anti-fouling film, which releases a dose of cuprous sulfide, can be removed in much the same way as graphic films would be removed.

The following non-limiting examples will further illustrate the tape of the present invention and several applications therefor.

Test Methods 1. 90° Peel Adhesion

A 25 mm by 152 mm strip of a sample of the tape is applied, adhesive side down, to a stainless steel test panel (AISI 302 or AISI 304). The sample of tape is rolled twice with a 4.5 kg roller to firmly bond it to the test panel. A free end of the tape sample is then separated by hand for a distance of about 25 mm and clamped in a tensile testing machine in the crosshead (i.e., upper) jaws thereof. The test panel is held fixed to a sliding trolley to keep the peel angle constant at 90° throughout the course of the test. The tape of the sample is peeled at a rate of 305 mm/min, the first 25 mm of peel data being discarded. The average peel force measured over the remaining peel length is recorded.

2. 180° Peel Adhesion

The sample to be tested consists of a backing laminated to or coated with a pressure-sensitive adhesive. A stainless steel test panel (AISI 302 or AISI 304) at least 50 mm by 150 mm is used as the substrate from which the sample is peeled. The last 25 mm of the length of the panel is covered with masking tape. Strips of tape samples 25 mm by 150 mm are adhered by way of the pressure-sensitive adhesive to one major surface of the stainless steel test panel such that the end of the sample overlies the masking tape. The sample of tape is rolled twice with a 4.5 kg roller to firmly bond it to the test panel. The major surface of the test panel not bearing the tape sample is adhered to the surface of an Instrumentors Inc. Model 3M90 Slip/Peel tester by means of a double-coated tape. One end of the test sample is separated from the masking tape by hand and peeled at a rate of 305 mm/min through a distance of 127 mm at a peel angle of 180°. The initial 25 mm of peel data is discarded. The average peel force measured over the remaining peel length is recorded.

3. Peel Adhesion at Other Angles

Figure 12:
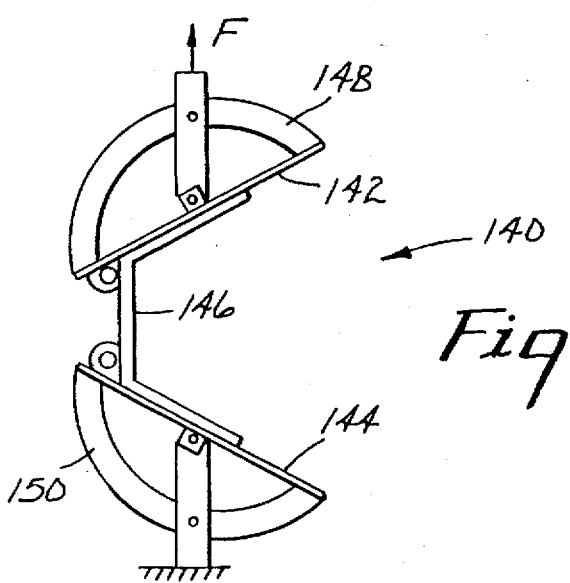
FIG. 12 is a schematic diagram that illustrates an apparatus for measuring peel adhesion at various angles.

A schematic diagram of an apparatus 140 for testing peel adhesion is shown in FIG. 12. Two stainless steel test panels 142, 144 (AISI 302 or AISI 304) are placed end to end a distance of 50 mm apart. A single strip of tape 146 of the sample having dimensions 25 mm by 254 mm is adhered to test panels 142 and 144, bridging the 50 mm gap between them. Tape 146 is rolled twice with a 4.5 kg roller to firmly bond it to test panels 142 and 144. Test panels 142 and 144 are mounted in a tensile tester by means of swivel grips 148 and 150 so that their surfaces form symmetrically inclined planes at the peel angle desired for the test. In this manner a continuous range of peel angles from 0° to 180° can be evaluated. The sample of tape 146 is mounted so that the peeling action occurs mainly within the center line of apparatus 140. Tape 146 is peeled simultaneously from both steel test panels 142 and 144 by moving the crosshead (not shown) at a rate of 305 mm/min. The average peel force measured over the course of peeling is recorded.

4. Stretch Force; Release Force

A double-coated tape sample is placed between two strips of anodized aluminum (25 mm by 50 mm by 0.125 mm), leaving an adhesive-free 25 mm tab protruding from one end of the assembly. The assembly is rolled twice with a 4.5 kg roller to firmly bond the sample to the aluminum strips. The assembly is mounted in a tensile testing machine so that the aluminum strips on either side of the sample is gripped in the lower (fixed) jaws, and the adhesive-free tab is clamped in the upper (crosshead) jaws. The jaws are separated at a rate of 305 mm/min, the average force required to effect debonding by stretching is recorded.

5. Shear Holding Power

A double-coated tape sample having the dimensions 25 mm by 25 mm is placed between two strips of anodized aluminum (25 mm by 50 mm) so that a 25 mm length of aluminum of one strip extends beyond one end of the tape sample and a 25 mm length of aluminum of the other strip extends beyond the other end of the tape sample. The 25 mm extensions of the aluminum strips are used as tabs for gripping by the jaws of a tensile testing machine. The aluminum strip/tape sample/aluminum strip assembly is rolled twice with a 4.5 kg roller to firmly bond the sample to the aluminum strips. The tabs of the aluminum strips are clamped in the upper and lower jaws of a tensile testing machine, and the jaws separated at a rate of 25 mm/min. The average force required to effect separation of the aluminum strips from the tape sample is recorded.

Comparative Examples A and B

The tapes of these examples were made in the same manner as were the tapes of Example 1, except that in one sample, Comparative Example A, the exposed adhesive layer was laminated to a 0.05 mm polyurethane film, in another sample, Comparative Example B, the exposed adhesive layer was laminated to a 0.025 mm polyester film, and in still another sample, Example 11, the exposed adhesive layer was laminated to a 0.05 mm ultra-low density polyethylene film. The films in Comparative Examples A and B had properties as shown in Table 1. These were also tested for peel at various angles and the results are shown in Table 2.

Figure 13:
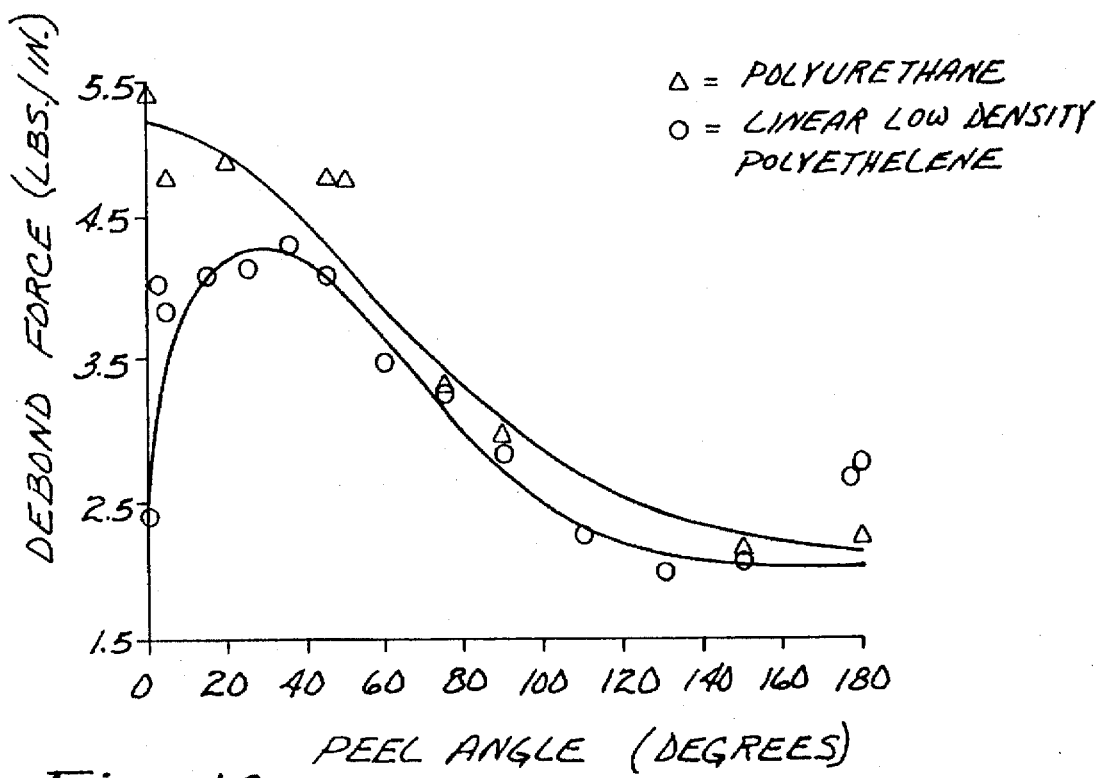
FIG. 13 is a graph showing the relationship between debond force and peel angle of the tape of the present invention.

As can be seen from FIG. 13, the plastic tape with linear low density polyethylene film backing (points indicated by O) clearly showed a minimum debonding force at 0° while the elastic tape with polyurethane backing (points indicated by Δ) showed maximum debonding force at 0°. Thus, stretchable plastic tapes provide a low debonding force from the surface of a substrate at low angles by simply stretching the tape. Polyester is not appreciably stretchable.

TABLE 1

|  | Example 1 (LLDPE)[1] | Comparative Example A (Polyurethane) | Comparative Example B (Polyester) | Example 11 (ULDPE)[2] |
| --- | --- | --- | --- | --- |
| Elastic Modulus (psi) | 28,986.0 | 4,619.0 | 445,515.0 | 11,773.0 |
| 50% Modulus (psi) | 4,000.0 | 1,860.0 | 35,600.0 | 2,352.0 |
| Yield stress (psi) | 1,743.0 | — | 16,273.0 | 897.0 |
| Yield strain (%) | 17.3 | — | 6.5 | 13.0 |
| Tensile strength (psi) | 7,931.0 | 6,157.0 | 28,054.0 | 6,484.0 |
| Elongation (%) | 748.0 | 434.0 | 132.0 | 545.0 |
| Recovery (%) | 5.4 | 94.0 | — | 21.3 |

[1]Linear low density polyethylene
[2]Ultra-low density polyethylene

EXAMPLE 1

An adhesive was made by partially polymerizing 100 g of a blend containing 90% by weight isooctylacrylate monomer and 10% by weight acrylic acid monomer and 0.04 part per hundred 2,2-dimethoxy-2-phenyl acetophenone ("Irgacure 651") to yield a coatable syrup having a viscosity of about 5,000 cps. To this syrup was then added an additional 0.25 g of a blend containing 90% by weight isooctylacrylate monomer and 10% by weight acrylic acid monomer and 0.04 part per hundred 2,2-dimethoxy-2-phenyl acetophenone ("Irgacure 651"), plus 0.125 g of 1,6-hexanediol diacrylate cross-linking agent. The composition was thoroughly mixed and coated onto a silicone-coated polyester film by means of a knife coater adjusted to produce an adhesive thickness of about 125 mm. After the coated syrup was purged thoroughly with nitrogen gas, it was covered with a second silicone-coated polyester film and polymerized by means of ultraviolet radiation using a total energy of 450 mJ/cm². The polyester liners were removed, and one of the exposed surfaces of the adhesive was then laminated to a 0.05 mm corona treated linear low density polyethylene film (available from Consolidated Thermoplastics Co.) having properties as shown in Table 1, while the other was laminated to a stainless steel panel and tested for peel at various angles. The results are shown in Table 2. Double-coated tapes for some tests were made simply by laminating a second adhesive layer to the other side of a 0.05 mm corona treated linear low density polyethylene film.

TABLE 2

| | Peel force (lb/in) | | |
| --- | --- | --- | --- |
| Peel angle (Degrees) | Linear low density polyethylene | Polyurethane | Polyester |
| 0 | 2.38 | 5.40 | — |
| 5 | 3.82 | 5.06 | 16.05 |
| 10 | — | — | 16.92 |
| 15 | 4.07 | 4.69 | 16.93 |
| 25 | 4.13 | 4.89 | 15.86 |
| 30 | — | 4.55 | — |
| 35 | 4.29 | — | 11.53 |
| 45 | 4.10 | 4.47 | 7.16 |
| 50 | — | 4.77 | — |
| 60 | 3.46 | — | 4.24 |
| 75 | 3.26 | 3.30 | 2.95 |
| 90 | 2.83 | 2.96 | 2.15 |
| 110 | 2.26 | — | 2.70 |
| 130 | 1.99 | — | 2.22 |
| 150 | 2.07 | 2.14 | 2.28 |
| 180 | 2.78 | 2.23 | 2.55 |

EXAMPLES 2–6

The tapes of these examples were made in the same manner as were the tapes of Example 1, except the level of croos-linking agent was varied, as shown in Table 3.

TABLE 3

| Amount of cross-linking agent (%) | 180° adhesion to steel (N/dm) | 180° adhesion to paper (N/dm) | Dynamic shear holding power (N/dm) | Stretch release adhesion (N/dm) |
| --- | --- | --- | --- | --- |
| 0.01 | 54 | 41.6 | 183 | 40.8 |
| 0.025 | 55 | 42.2 | 192 | 42.8 |
| 0.05 | 58 | 41.8 | 201 | 43.8 |
| 0.10 | 49 | 37.6 | 202 | 44.7 |
| 0.18 | 39 | 34.4 | 207 | 46.3 |
| Tackified IOA/AA* | 35 | 42.2 | 180 | 49.1 |

*Tackified IOA/AA contained 90 parts isooctyl acrylate, 10 parts acrylic acid, and 10 parts tackifier ("Foral-85"), available from Hercules, Inc.).

The data clearly show that increasing the concentration of cross-linking agent decreases 180° peel adhesion while increasing holding power (dynamic shear). Surprisingly, the level of low angle debonding increases as level of cross-linking agent increases.

EXAMPLE 7

The tape of this example was made in the same manner as was the tape of Example 1 except that 10 parts of tackifier (a rosin ester, "Foral 85", available from Hercules, Inc.) was also added. The adhesion forces were measured and are set forth in Table 3. The data show that the addition of tackifier clearly increased the debonding force at a peel angle of 0°.

EXAMPLE 8

The tape of this example was made in the same manner as was the tape of Example 1, except that the tape was coated with a removable, repositionable adhesive on one surface of the corona treated linear low density polyethylene film to produce a tape with differential adhesion. This tape is especially useful for mounting and display of light weight objects such as photographs, signs, cards, calendars, etc., where repeated mounting is desirable.

EXAMPLE 9

The tape of this example was made by coating a linear low density polyethylene film (0.1 mm thick) with 8.4 grains of a block copolymer ("Kraton 1107", available from Shell Corporation), tackified with a resin tackifier ("WINGTACK PLUS", available from Goodyear Chemicals). A strip of this tape (0.127 cm wide by 50 cm long) was wrapped around three 5 cm by 9 cm by 15 cm decorated boxes of a snack food product. After being aged for 48 hours at room temperature, the tape was removed at a peel angle of 90° and the surface of the package was completely damaged, spoiling the graphics. When the tape was removed by stretching it at an angle of 0°, the tape was removed cleanly, leaving no residual adhesive and without damaging the package or spoiling the graphics.

EXAMPLE 10

The liner was removed from an adhesive coated vinyl film (3650 "Scotchcal" film, available from Minnesota Mining and Manufacturing Company, St. Paul, Minn.), and then the film was laminated to the following extensible polymeric sheets: polyether-polyurethane (1 mil), polyester-polyurethane (3 mil), unoriented linear low density polyethylene (2 mil), unoriented polypropylene (1 mil, corona side up), and unoriented polypropylene (1 mil, corona side down). The same pressure-sensitive adhesive used with 3650 "Scotchcal" film was then coated on the back side of each extensible polymeric sheet, except for the polypropylene sheets, where adhesive for transfer tape was used. The tensile strength and average elongation to break were measured for these assemblies. One inch wide samples of these assemblies were laminated to steel panels and aged four days at 66° C. Peel forces were then measured for these assemblies at peel angles of 180° and 7°. The mode of failure was then noted. Ply failure refers to failure between the adhesive and extensible polymeric sheet. Film break failure refers to breaking of the adhesive-coated vinyl film.

The results at 7° peel angle show that nearly 100% of the film was removed from the polyurethane and linear low density polyethylene extensible polymeric sheets. In addition, these films did not break during removal, while the 3650 "Scotchcal" film broke easily. Therefore it appears that the extensible polymeric film provided another unexpected advantage, namely reinforcing the "Scotchcal" vinyl film. This property can be used to provide enhanced durability during the lifetime of the "Scotchcal" film.

The linear low density polyethylene extensible polymeric film was the most desirable from the standpoint of conformability to topography due to the plastic nature of the film, i.e., it will readily stretch to conform to rivets, corrugation, etc. The polyurethane films on the other hand are elastic and would not conform upon stretching and release.

Various modifications and alterations of this invention will become apparent to those skilled in the art without departing from the scope and spirit of this invention, and it should be understood that this invention is not to be unduly limited to the illustrative embodiments set forth herein.

We claim:

1. An assembly comprising a container including first and second relatively moveable panels positioned in a closely adjacent closed position to close the container, and being moveable to an open position with said relatively moveable panels spaced apart to open said container, said relatively moveable panels including attached portions having surfaces that are closely adjacent in said closed position; and a tape sealing said relatively movable panels in said closed position, said tape being highly extensible, having first and second opposite tape surfaces, and sealing means for attaching the first tape surface to the surface of the attached portion on the first panel and comprising a layer of pressure sensitive adhesive defining the second tape surface for adhering the tape to the surface of the attached portion of said second panel to thereby retain the relatively moveable panels in said closed position, said tape being highly extensible and removable from said attached portions by stretching said tape to at least about 150% of its initial length at an angle no greater than about 35° from the surfaces of said attached portions, said tape including a tab portion projecting past at least one of said relatively moveable panels and adapted for manual engagement to afford manual stretching of said tape.

2. An assembly according to claim 1, wherein said layer of pressure sensitive adhesive extends along said tab portion, and said assembly includes a layer of non-adhesive material adapted for manual engagement over the layer of adhesive on said tab portion.

3. An assembly according to claim 1 wherein said surfaces of said attached portions are parallel and opposed in said closed position of said panels, and said tape is positioned between said opposed parallel surfaces of said attached portions.

4. An assembly according to claim 1 wherein said container includes a bottom panel having a peripheral edge, opposed side panels each having a proximal edge attached to the peripheral edge of said bottom panel, having an opposite distal edge, and projecting at a right angle from said bottom panel, and said relatively moveable panels have attached edges attached to the distal edges of said side panels and opposite edges, said surfaces of said attached portions of said relatively moveable panels being along said opposite edges.

5. An assembly according to claim 2, wherein said tape comprises a highly extensible, substantially non-recoverable plastic backing having opposite first and second major surfaces, said layer of pressure-sensitive adhesive is along the second surface of said backing and adheres the backing to the surface of the attached portion on the second panel, and said tape further includes a second layer of adhesive adhering the first surface of said backing to the surface of the attached portion on said first panel.

6. An assembly according to claim 5, wherein said tab portion comprises a portion of said backing free of adhesive.

7. An assembly according to claim 5, wherein said layers of adhesive extend along said tab, and said assembly includes a layer of non-adhesive material adapted for manual engagement extending over the layers of adhesive on said tab portion.

8. An assembly according to claim 5 wherein said plastic backing has an elongation at break of from about 150% to 1200% and a young's modulus of at least about 2,500 psi but less than about 72,500 psi, said backing having a tensile strength at break sufficiently high so that said backing will not rupture prior to the removal of said tape from said panels.

* * * * *

UNITED STATES PATENT AND TRADEMARK OFFICE
CERTIFICATE OF CORRECTION

PATENT NO.:     5,672,402

DATED:          September 30, 1997

INVENTOR(S):    Kreckel et al.

It is certified that error appears in the above-identified patent and that said Letters Patent is hereby corrected as shown below:

Title page, Inventors address, "Marine, both of Minn." should read --Marine on St. Croix, both of Minn.--.

Signed and Sealed this

Twenty-seventh Day of October, 1998

Attest:

BRUCE LEHMAN

*Attesting Officer*          Commissioner of Patents and Trademarks